US008024709B2

(12) United States Patent
Jadhav et al.

(10) Patent No.: US 8,024,709 B2
(45) Date of Patent: Sep. 20, 2011

(54) FACILITATING ASSESSMENT OF A TEST SUITE OF A SOFTWARE PRODUCT

(75) Inventors: Ranjit Jadhav, Ahmednagar (IN); Ashish Munge, Mumbai (IN); Ritu Bhargava, Jaipur (IN); Cyndi Lambinicio, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1170 days.

(21) Appl. No.: 11/744,920

(22) Filed: May 7, 2007

(65) Prior Publication Data

US 2008/0282235 A1 Nov. 13, 2008

(51) Int. Cl.
G06F 9/44 (2006.01)
(52) U.S. Cl. .......................... 717/124; 717/131; 714/738
(58) Field of Classification Search .......... 717/124–167; 714/708, 718, 727, 738, 744
See application file for complete search history.

(56) References Cited

U.S. PATENT DOCUMENTS

| | | | | |
|---|---|---|---|---|
| 6,721,941 B1 * | 4/2004 | Morshed et al. | | 717/127 |
| 6,959,431 B1 * | 10/2005 | Shiels et al. | | 714/38 |
| 7,080,356 B2 * | 7/2006 | Atallah et al. | | 717/124 |
| 7,139,676 B2 * | 11/2006 | Barford | | 702/183 |
| 2004/0128653 A1 * | 7/2004 | Arcand | | 717/124 |

OTHER PUBLICATIONS

Avritzer, A.; Weyuker, E.R.; , "The automatic generation of load test suites and the assessment of the resulting software," Software Engineering, IEEE Transactions on , vol. 21, No. 9, pp. 705-716, Sep. 1995 doi: 10.1109/32.464549 URL: http://ieeexplore.ieee.org/stamp/stamp.jsp?tp=&isnumber=464549&isnumber=9733.*
Nagappan, N.; Williams, L.; Osborne, J.; Vouk, M.; Abrahamsson, P.; , "Providing test quality feedback using static source code and automatic test suite metrics," Software Reliability Engineering, 2005. ISSRE 2005. 16th IEEE International Symposium on , vol., No., pp. 10 pp. 94, 1-1 Nov. 2005 doi: 10.1109/ISSRE.2005.35.*
E. Michael Maximilien IBM Corp. and NCSU, Raleigh, NC; Laurie Williams North Carolina State University, Raleigh, NC; Assessing test-driven development at IBM; IEEE; 2003; pp. 564-569.*
Avritzer, A.; Weyuker, E.R.; ,"The automatic generation of load test suites and the assessment of the resulting software," Software Engineering, IEEE Transactions on , vol. 21, No. 9, pp. 705-716, Sep. 1995, doi: 10.1109/32.464549, URL: http://ieeexplore.ieee.org/stamp/stamp.jsp?tp=&arnumber=464549&isnumber=9733.*
Nagappan, N.; Williams, L.; Osborne, J.; Vouk, M.; Abrahamsson, P.; "Providing test quality feedback using static source code and automatic test suite metrics," Software Reliability Engineering, 2005. ISSRE 2005. 16th IEEE International Symposium on , vol., No., pp. 10 pp. 94, 1-1 Nov. 2005.*
"Mercury Quality Center", http://www.mercury.com/us/products/quality-center/, Downloaded circa: Sep. 2007, pp. 1-1.

(Continued)

*Primary Examiner* — Wei Zhen
*Assistant Examiner* — Satish Rampuria
(74) *Attorney, Agent, or Firm* — Narendra Reddy Thappeta

(57) ABSTRACT

Facilitating assessment of a test suite of a software product. In an embodiment, an inventory is maintained containing the features of the software product and one or more execution flows operative when a feature is provided by the software product. Information related to execution flows for which test scripts are present (in the test suite) is also indicated in the inventory. Various test metrics and views are provided to a user facilitating the user to assess the test suite of the software product.

25 Claims, 13 Drawing Sheets

OTHER PUBLICATIONS

"Mercury Quality Center Brochure", Jan. 2007, pp. 1-2.
"Mercury Managed Services for Quality Center", 2005, pp. 1-2.
"Mercury Testdirector", http://www.mercury.com/us/products/quality-center/testdirector/, Downloaded circa: Sep. 2007, pp. 1-1.
"HP Testdirector for Quality Center Software Data Sheet", May 2007, pp. 1-4.
"Tools and Techniques for Superior Test Management", May 2007, pp. 1-16.

* cited by examiner

|  | Feature Name 310 | No. of Execution Flows 315 | FTS Completed 320 | ATS Completed 325 | Type K (Key Entity/VHP) Flows 330 | | |
|---|---|---|---|---|---|---|---|
|  |  |  |  |  | Total 332 | In FTS 334 | In ATS 336 |
| 351 | Setups | 129 | 103 | 100 | 15 | 10 | 10 |
| 352 | Additions & Adjustments | 259 | 88 | 50 | 21 | 18 | 18 |
| 353 | Mass Additions | 47 | 9 | 9 | 6 | 4 | 4 |
| 354 | Depreciation | 91 | 67 | 21 | 5 | 4 | 4 |
| 355 | Tax Accounting | 52 | 9 | 6 | 4 | 4 | 4 |
| 356 | Changes | 57 | 12 | 12 | 2 | 2 | 2 |
| 357 | Transfers | 23 | 3 | 1 | 1 | 1 | 1 |
| 358 | Reclassifications | 44 | 5 | 0 | 0 | 0 | 0 |
| 359 | Retirements & reinstatements | 156 | 59 | 59 | 10 | 10 | 10 |
| 360 | Revaluations | 37 | 11 | 11 | 7 | 7 | 7 |
| 361 | Group Depreciation | 290 | 262 | 232 | 7 | 7 | 7 |
| 362 | Forecasting | 102 | 2 | 0 | 0 | 0 | 0 |
| 363 | Physical Inventory | 4 | 0 | 0 | 0 | 0 | 0 |
| 364 | Journal Entries | 17 | 3 | 1 | 5 | 1 | 1 |
| 365 | Capital Budgeting | 9 | 5 | 0 | 0 | 0 | 0 |
| 366 | Lease Payments | 26 | 25 | 25 | 2 | 2 | 2 |
| 367 | Security By Book | 25 | 14 | 14 | 0 | 0 | 0 |
| 368 | Production Interface | 5 | 1 | 1 | 0 | 0 | 0 |
| 369 | Data Archive | 6 | 0 | 0 | 0 | 0 | 0 |
| 370 | Reports | 130 | 44 | 28 | 10 | 10 | 10 |
| 371 | Integration | 7 | 4 | 4 | 3 | 3 | 3 |
| 372 | XML Reports | 14 | 13 | 3 | 0 | 0 | 0 |
| 373 | Web ADI | 11 | 0 | 0 | 0 | 0 | 0 |
| 374 | Asset Inquiry | 3 | 0 | 0 | 0 | 0 | 0 |
| 375 | Impairment | 9 | 0 | 0 | 8 | 0 | 0 |
| 390 | Total Numbers | 1553 | 737 | 577 | 106 | 83 | 83 |

*FIG. 3*

| Sr. No 410 | Execution Flow Description 415 | Priority 420 | Include in FTS? 422 | Include in ATS? 424 | Actual Execution time 426 | Source 430 | Date of Addition 432 | Release Baseline 434 | Added By 436 | xBuild(s) Tested in system 1 440 | xBuild(s) Tested in system 2 442 | xBuild(s) Tested in system 3 444 | xBuild(s) Tested Certification 446 | Certification tester 448 |
|---|---|---|---|---|---|---|---|---|---|---|---|---|---|---|
| FAJE001 | Journal Entry - General | Low | No | No | | Manual | 6-Mar | 11iFAA | Hari | | | | | |
| FAJE002 | Create Accounting - Rollback - with period open - Corporate book | Medium | Yes | No | | SystemTP | 4-Dec | 11iFAA | Hari | 4,5,6 | 7,9,11 | | | |
| FAJE003 | Create Accounting - Create - with period Close - Corporate book | Medium | Yes | No | | SystemTP | 4-Dec | 11iFAA | Hari | 3,4 | 7,9,11 | | | |
| FAJE004 | Create Accounting - Create - with period open - Tax book | High | No | No | | Manual | 4-Dec | 11iFAA | Hari | 3 | 7,9,11 | | | |
| FAJE005 | Create Accounting - Rollback - with period open - Tax book | High | No | No | | Manual | 4-Dec | 11iFAA | Hari | 3 | 7,9,11 | | | |
| FAJE006 | Create Accounting - Create - with period Close - Tax book | High | No | No | | Manual | 4-Dec | 11iFAA | Hari | 3 | 7,9,11 | | | |
| FAJE007 | Deferred Journal entry - Create - with period open | High | No | No | | Manual | 4-Dec | 11iFAA | Hari | | | | | |
| FAJE008 | Deferred Journal entry - Rollback - with period open | Medium | No | No | | Manual | 4-Dec | 11iFAA | Hari | | | | | |
| FAJE009 | Deferred Journal entry - Create - with period Close | Medium | No | No | | Manual | 4-Dec | 11iFAA | Hari | 4,5,6 | | | | |
| FAJE0010 | Post this journal in GL | Medium | No | No | | Manual | 4-Dec | 11iFAA | Hari | 3,4 | 7,9,11 | | | |
| FAJE0011 | Try to reverse the journal in FA after its posted in GL | High | No | No | | Manual | 4-Dec | 11iFAA | Hari | 3,4,5,6 | | | | |
| FAJE0012 | Rerun Standard journal in open period | High | No | No | | Manual | 4-Dec | 11iFAA | Hari | 3,4,5,6 | | | | |
| FAJE0013 | Create accounting | Very High | Yes | Yes | | Type K | 6-Feb | R12 | PM | 3,4,5,6 | 7,9,11 | 13 | 15 | Rajest |
| FAJE0014 | Run for null process category | Very High | No | No | | Manual | 6-Feb | R12 | PM | 3,4,5,6 | 7,9,11 | | | |
| FAJE0015 | Run for each of the process categories | Very High | No | No | | Manual | 6-Feb | R12 | PM | 3,4,5,6 | 7,9,11 | 13 | | Vishal |
| FAJE0016 | Transfer to GL yes / no | Very High | No | No | | Manual | 6-Feb | R12 | PM | 3,4,5,6 | 7,9,11 | | | |
| FAJE0017 | Post to GL yes / no | Very High | No | No | | Manual | 6-Feb | R12 | PM | | 7,9,11 | | | |

*FIG. 4A*

| | Sr. No 470 | Execution Flow Description 475 | Product Feature/ Functionality 477 | Integration Point [with which other product(s)]? 479 | Priority 480 | Included in FTS? 482 | Included in ATS? 484 | Actual Execution Time(Hrs) 486 | Source 488 | Date of Addition 489 |
|---|---|---|---|---|---|---|---|---|---|---|
| 491 → | FAIT001 | Integration - General | | | Low | No | No | | | |
| 492 → | FAIT002 | Create Accounting - Create - with period open - Corporate Book | Setup | GL | Very High | Yes | Yes | | | |
| 493 → | FAIT003 | Create Mass Addition asset from AP interface | Additions | AP | Very High | Yes | Yes | | | |
| 494 → | FAIT004 | Run Request for "Payables transfer to GL" | Additions | AP | Very High | Yes | Yes | | | |
| 495 → | FAIT005 | Run Request for "Mass Addition Create" | Additions | AP | High | Yes | Yes | | | |
| 496 → | FAIT006 | Create Mass Addition asset from PO interface | Additions | PO | High | No | No | | | |
| 497 → | FAIT007 | Create Mass Addition asset from Project interface | Additions | PRJ | High | No | No | | | |

*FIG. 4B*

| Execution Flow Type & Feature Name 510 | Feature Weightage "%" (wrt to the software product) 520 | Total Execution Flows 530 | FTS Coverage | | |
|---|---|---|---|---|---|
| | | | Completed FTS 542 | Percentage of Completed FTS 544 | Percentage of Functionality Covered in Completed FTS 546 |
| B | C | D | E | F =E/D | G=C*F |
| Type A - UI & Reports | 4% | 130 | 44 | 34% | 1% |
| Form Opening and Query | 0% | 0 | 0 | 0% | 0% |
| Reports | 4% | 130 | 44 | 34% | 1% |
| Type S - Setups | 5% | 129 | 103 | 80% | 4% |
| Setups | 5% | 129 | 103 | 80% | 4% |
| Type B - Business Flows | 91% | 1294 | 590 | 46% | 42% |
| Additions & Adjustments | 8% | 259 | 88 | 34% | 3% |
| Mass Additions | 3% | 47 | 9 | 19% | 1% |
| Depreciation | 11% | 91 | 67 | 74% | 8% |
| Tax Accounting | 4% | 52 | 9 | 17% | 1% |
| Changes | 2% | 57 | 12 | 21% | 0% |
| Transfers | 2% | 23 | 3 | 13% | 0% |
| Reclassifications | 3% | 44 | 3 | 7% | 0% |
| Retirements & reinstatements | 7% | 156 | 59 | 38% | 3% |
| Revaluations | 5% | 37 | 11 | 30% | 2% |
| Group Depreciation | 25% | 290 | 262 | 90% | 23% |
| Forecasting | 2% | 102 | 2 | 2% | 0% |
| Physical Inventory | 1% | 4 | 0 | 0% | 0% |
| Journal Entries | 2% | 17 | 3 | 18% | 0% |
| Capital Budgeting | 1% | 9 | 5 | 56% | 1% |
| Lease Payments | 3% | 26 | 25 | 96% | 3% |
| Security By Book | 3% | 25 | 14 | 56% | 2% |
| Production Interface | 1% | 5 | 1 | 20% | 0% |
| Data Archive | 1% | 6 | 0 | 0% | 0% |
| Integration | 2% | 7 | 4 | 57% | 1% |
| XML Reports | 2% | 14 | 13 | 93% | 2% |
| Web ADI | 1% | 11 | 0 | 0% | 0% |
| Asset Inquiry | 1% | 3 | 0 | 0% | 0% |
| Asset Impairment | 1% | 9 | 0 | 0% | 0% |
| Type K - Key Entity (VHP) Flows | 100% | 106 | 83 | 78% | 78% |
| Type K | 100% | 106 | 83 | 78% | 78% |
| Totals | 100% | 1553 | 737 | 47% | 47% |

*FIG. 5*

| Execution Flow Type & Feature Name | Feature Weightage "%" (wrt to the product) | Total Execution Flows | Automation Coverage 640 | | | | | |
|---|---|---|---|---|---|---|---|---|
| | | | Automation of completed FTS | Percentage of Automation Completed | Additional Automoted Execution flows (w/o FTS) | Total of Automated Execution Flows Available | % of Total Automated Test Flows Available | Percentage of Functionality Automated |
| | 610 | 620 | 630 | 642 | 643 | 645 | 646 | 648 | 649 |
| | B | C | D | H | I=H/E | J | K=H+J | L=K/D | M=C*L |
| Type A - UI & Reports | 4% | 130 | 28 | 64% | 4 | 32 | - | 1% |
| 661 → Form Opening and Query | 0% | 0 | 0 | - | 0 | 0 | 0% | 0% |
| 662 → Reports | 4% | 130 | 28 | 64% | 4 | 32 | 25% | 1% |
| Reports | | | | | | | | |
| Types S - Setups | 5% | 129 | 100 | 97% | 0 | 100 | - | 4% |
| 663 → Setups | 5% | 129 | 100 | 97% | 0 | 100 | 78% | 4% |
| Type B - Business Flows | 91% | 1294 | 449 | 76% | 1 | 450 | 35% | 32% |
| 664 → Additions & Adjustments | 8% | 259 | 50 | 57% | 0 | 50 | 19% | 2% |
| 665 → Mass Additions | 3% | 47 | 9 | 100% | 0 | 9 | 19% | 1% |
| 666 → Depreciation | 11% | 91 | 21 | 31% | 0 | 21 | 23% | 3% |
| 667 → Tax Accounting | 4% | 52 | 6 | 67% | 0 | 6 | 12% | 0% |
| 668 → Changes | 2% | 57 | 12 | 100% | 0 | 12 | 21% | 0% |
| 669 → Transfers | 2% | 23 | 1 | 33% | 0 | 1 | 4% | 0% |
| 670 → Reclassifications | 3% | 44 | 0 | 0% | 0 | 0 | 0% | 0% |
| 671 → Retirements & reinstatements | 7% | 156 | 59 | 100% | 0 | 59 | 38% | 3% |
| 672 → Revaluations | 5% | 37 | 11 | 100% | 0 | 11 | 30% | 2% |
| 673 → Group Depreciation | 25% | 290 | 232 | 89% | 0 | 23 | 80% | 20% |
| 674 → Forecasting | 2% | 102 | 0 | 0% | 0 | 0 | 0% | 0% |
| 675 → Physical Inventory | 1% | 4 | 0 | - | 0 | 0 | 0% | 0% |
| 676 → Journal Entries | 2% | 17 | 1 | 33% | 0 | 1 | 6% | 0% |
| 677 → Capital Budgeting | 1% | 9 | 0 | 0% | 0 | 0 | 0% | 0% |
| 678 → Lease Payments | 3% | 26 | 25 | 100% | 0 | 25 | 96% | 3% |
| 679 → Security By Book | 3% | 25 | 14 | 100% | 0 | 14 | 56% | 2% |
| 680 → Production Interface | 1% | 5 | 1 | 100% | 0 | 1 | 20% | 0% |
| 681 → Data Archive | 1% | 6 | 0 | - | 0 | 0 | 0% | 0% |
| 682 → Integration | 2% | 7 | 4 | 100% | 1 | 5 | 71% | 1% |
| 683 → XML Reports | 2% | 14 | 3 | 23% | 0 | 2% | 21% | 0% |
| 684 → Web ADI | 1% | 11 | 0 | - | 0 | 0 | 0% | 0% |
| 685 → Asset Inquiry | 1% | 3 | 0 | - | 0 | 0 | 0% | 0% |
| 686 → Asset Impairment | 1% | 9 | 0 | - | 0 | 0 | 0% | 0% |
| 690 → Type K - Key Entity (VHP) Flows | 100% | 106 | 83 | 100% | 0 | 83 | 78% | 78% |
| Type K | 100% | 106 | 83 | 100% | 0 | 83 | 78% | 78% |
| 695 → Totals | 100% | 1553 | 577 | 78% | 5 | 582 | 37% | 37% |

FIG. 6

| | | | | | | | Execution Time (Hrs) | | | | | | | 740 | |
|---|---|---|---|---|---|---|---|---|---|---|---|---|---|---|---|
| Execution Flow Type & Feature Name | Total Execution Flows | FTS Available | ATS Available | Actual Execution Flows Execution Time (Hrs) | Standard Manual Flows Execution Time(Hrs) | ATS Execution Time | Manual Execution(All Execution Flows) 744 | | | | Manual Execution(Test Flows Not Automated) 748 | | | | Composite Time (Manual + Automated) 750 |
| | | | | | | | VH 744A | VH+H 744B | VH+H+M 744C | VH+H+M+L 744D | VH 748A | VH+H 748B | VH+H+M 748C | VH+H+M+L 748D | |
| 710 | 715 | 720 | 725 | 730 | 735 | 742 | | | | | | | | | VH+H+M+L |
| Type A - UI & Reports | 130 | 44 | 28 | | | 2 | 5 | 34 | 65 | 65 | 0 | 24 | 51 | 51 | 53 |
| Form Opening and Query | 0 | 0 | 0 | | | | | | | | | | | | |
| Reports | 130 | 44 | 28 | | 0.50 | 2 | 5 | 34 | 65 | 65 | 0 | 24 | 51 | 51 | 53 |
| Types S - Setups | 129 | 103 | 100 | | | 5 | 8 | 28 | 57 | 65 | 3 | 6 | 12 | 15 | 20 |
| Setups | 129 | 103 | 100 | | 0.50 | 5 | 8 | 28 | 57 | 65 | 3 | 6 | 12 | 15 | 20 |
| Type B - Business Flows | 1294 | 590 | 449 | | | 40 | 41 | 308 | 620 | 647 | 7 | 204 | 385 | 423 | 463 |
| Additions & Adjustments | 259 | 88 | 50 | | 0.50 | | 11 | 112 | 129 | 130 | 2 | 88 | 104 | 105 | |
| Mass Additions | 47 | 9 | 9 | | 0.50 | | 3 | 16 | 21 | 24 | 1 | 12 | 17 | 19 | |
| Depreciation | 91 | 67 | 21 | | 0.50 | | 3 | 12 | 44 | 46 | 1 | 6 | 35 | 35 | |
| Tax Accounting | 52 | 9 | 6 | | 0.50 | | 2 | 17 | 26 | 26 | 0 | 14 | 23 | 23 | |
| Changes | 57 | 12 | 12 | | 0.50 | | 1 | 15 | 28 | 29 | 0 | 12 | 22 | 23 | |
| Transfers | 23 | 3 | 1 | | 0.50 | | 1 | 7 | 11 | 12 | 0 | 6 | 11 | 11 | |
| Reclassifications | 44 | 3 | 0 | | 0.50 | | 0 | 9 | 18 | 22 | 0 | 9 | 18 | 22 | |
| Retirements & reinstatements | 156 | 59 | 59 | | 0.50 | | 5 | 20 | 73 | 78 | 0 | 8 | 44 | 49 | |
| Revaluations | 37 | 11 | 11 | | 0.50 | | 4 | 12 | 18 | 19 | 0 | 7 | 13 | 13 | |
| Group Depreciation | 290 | 262 | 232 | | 0.50 | | 4 | 44 | 145 | 145 | 0 | 20 | 29 | 29 | |
| Forecasting | 102 | 2 | 0 | | 0.50 | | 0 | 8 | 48 | 51 | 0 | 8 | 48 | 51 | |
| Physical Inventory | 4 | 0 | 0 | | 0.50 | | 0 | 0 | 2 | 2 | 0 | 0 | 2 | 2 | |
| Journal Entries | 17 | 3 | 1 | | 0.50 | | 3 | 6 | 8 | 9 | 2 | 5 | 8 | 8 | |
| Capital Budgeting | 9 | 5 | 1 | | 0.50 | | 0 | 1 | 4 | 5 | 0 | 1 | 4 | 5 | |
| Lease Payments | 26 | 25 | 25 | | 0.50 | | 1 | 3 | 13 | 13 | 0 | 0 | 0 | 1 | |
| Security By Book | 25 | 14 | 14 | | 0.50 | | 0 | 12 | 12 | 13 | 0 | 5 | 5 | 6 | |
| Production Interface | 5 | 1 | 1 | | 0.50 | | 0 | 1 | 2 | 3 | 0 | 1 | 2 | 2 | |
| Data Archive | 6 | 0 | 0 | | 0.50 | | 0 | 3 | 3 | 3 | 0 | 3 | 3 | 3 | |
| Integration | 7 | 4 | 4 | | 0.50 | | 2 | 3 | 3 | 4 | 2 | 2 | 2 | 2 | |
| XML Reports | 14 | 13 | 3 | | 0.50 | | 0 | 5 | 7 | 7 | 0 | 1 | 2 | 6 | |
| Web ADI | 11 | 0 | 0 | | 0.50 | | 0 | 2 | 5 | 6 | 0 | 0 | 0 | 6 | |
| Asset Inquiry | 3 | 0 | 0 | | 0.50 | | 0 | 1 | 1 | 2 | 0 | 0 | 0 | 2 | |
| Impairment | 9 | 0 | 0 | | 0.50 | | 4 | 4 | 4 | 5 | 0 | 0 | 0 | 5 | |
| Type K - Key Entity (VHP) Flows | 106 | 83 | 83 | | | 2 | 42 | | | | 0 | | | | 2 |
| Type K | 106 | 83 | 83 | | 0.50 | 2 | 42 | | | | 0 | | | | 2 |

*FIG. 7*

| Product | All Flows | xBuild 19 (Certification) | | | | | | | | Percentage Completion | | Certification Test Completion | | Open Functional Bugs |
|---|---|---|---|---|---|---|---|---|---|---|---|---|---|---|
| | | Pass | Fail | | | | | | Unable to Test | Pass | Fail | Pass | Fail | Total |
| | | | Previous Xbuild | | | Current Xbuild | | | Total | | | | | |
| | | | Open | Fixed | Verified | Open | Fixed | Verified | | | | | | |
| Customer Data Management | | | | | | | | | | | | | | |
| hz | 116 | 116 | 0 | 0 | 0 | 0 | 0 | 0 | 0 | 100% | 0% | 100% | 0% | 27 |
| imc | 36 | 36 | 0 | 0 | 0 | 0 | 0 | 0 | 0 | 100% | 0% | 100% | 0% | 32 |
| Total | 152 | 152 | 0 | 0 | 0 | 0 | 0 | 0 | 0 | 100% | 0% | 100% | 0% | 59 |
| Financials | | | | | | | | | | | | | | |
| amw | 262 | 262 | 0 | 0 | 0 | 0 | 0 | 0 | 0 | 100% | 0% | 100% | 0% | 56 |
| ap | 41 | 41 | 14 | 1 | 0 | 0 | 0 | 0 | 0 | 100% | 0% | 100% | 0% | 126 |
| ar | 66 | 66 | 32 | 0 | 1 | 0 | 0 | 0 | 0 | 100% | 0% | 100% | 0% | 104 |
| bpa | 13 | 13 | 0 | 0 | 0 | 0 | 0 | 0 | 0 | 100% | 0% | 100% | 0% | 7 |
| ce | 72 | 72 | 0 | 0 | 0 | 0 | 0 | 0 | 0 | 100% | 0% | 100% | 0% | 44 |
| fa | 208 | 208 | 0 | 0 | 0 | 0 | 0 | 0 | 0 | 100% | 0% | 100% | 0% | 15 |
| fun | 53 | 53 | 0 | 0 | 0 | 0 | 0 | 0 | 0 | 100% | 0% | 100% | 0% | 85 |
| gcs | 26 | 26 | 0 | 0 | 0 | 0 | 0 | 0 | 0 | 100% | 0% | 100% | 0% | 0 |
| gl | 120 | 120 | 0 | 0 | 0 | 0 | 0 | 0 | 0 | 100% | 0% | 100% | 0% | 55 |
| ia | 49 | 49 | 0 | 0 | 0 | 0 | 0 | 0 | 0 | 100% | 0% | 100% | 0% | 15 |
| iby | 4 | 4 | 0 | 0 | 0 | 0 | 0 | 0 | 0 | 100% | 0% | 100% | 0% | 193 |
| iex | 22 | 22 | 0 | 0 | 0 | 0 | 0 | 0 | 0 | 100% | 0% | 100% | 0% | 24 |
| ita | 37 | 37 | 0 | 0 | 0 | 0 | 0 | 0 | 0 | 100% | 0% | 100% | 0% | 16 |
| ja | 52 | 52 | 0 | 0 | 0 | 0 | 0 | 0 | 0 | 100% | 0% | 100% | 0% | 6 |
| jai | 30 | 30 | 0 | 0 | 0 | 0 | 0 | 0 | 0 | 100% | 0% | 100% | 0% | 0 |
| je | 1 | 1 | 0 | 0 | 0 | 0 | 0 | 0 | 0 | 100% | 0% | 100% | 0% | 62 |
| jl | 64 | 54 | 0 | 0 | 0 | 0 | 0 | 0 | 0 | 100% | 0% | 100% | 0% | 16 |
| lns | 22 | 22 | 0 | 0 | 0 | 0 | 0 | 0 | 0 | 100% | 0% | 100% | 0% | 15 |
| ocm | 19 | 19 | 10 | 0 | 0 | 0 | 0 | 0 | 0 | 100% | 0% | 100% | 0% | 22 |
| oir | 38 | 38 | 0 | 0 | 0 | 0 | 0 | 0 | 0 | 100% | 0% | 100% | 0% | 15 |
| xla | 10 | 10 | 5 | 1 | 0 | 0 | 0 | 0 | 0 | 100% | 0% | 100% | 0% | 141 |
| xle | 205 | 205 | 1 | 0 | 0 | 0 | 0 | 0 | 0 | 100% | 0% | 100% | 0% | 25 |
| xtr | 180 | 180 | 0 | 0 | 0 | 0 | 0 | 0 | 0 | 100% | 0% | 100% | 0% | 0 |
| zx | 51 | 51 | 0 | 0 | 0 | 0 | 0 | 0 | 0 | 100% | 0% | 100% | 0% | 38 |
| Total | 1645 | 1635 | 62 | 2 | 1 | 0 | 0 | 0 | 0 | 100.0% | 0% | 100.0% | 0% | 1080 |

*FIG. 9A*

| Feature Level Details | | | | | | | | | | |
|---|---|---|---|---|---|---|---|---|---|---|
| Feature 930 | Number of Flows 934 | | | | | | | Percentage Completion 936 | | Open Functional Bugs 938 |
| | All | Planned to Test | Pass | Fail | Unable to Test | WIP | Not Started | Pass | Fail | Total |
| 940 → ADDITIONS AND ADJUSTMENTS | 26 | 26 | 26 | 0 | 0 | 0 | 0 | 100% | 0% | 1 |
| 941 → DEPRECIATION | 22 | 22 | 22 | 0 | 0 | 0 | 0 | 100% | 0% | 0 |
| 942 → INTEGRATION | 4 | 4 | 4 | 0 | 0 | 0 | 0 | 100% | 0% | 0 |
| 943 → JOURNAL ENTRY | 2 | 2 | 2 | 0 | 0 | 0 | 0 | 100% | 0% | 0 |
| 944 → MASS ADDITIONS | 4 | 4 | 4 | 0 | 0 | 0 | 0 | 100% | 0% | 0 |
| 945 → MASS CHANGES | 1 | 1 | 1 | 0 | 0 | 0 | 0 | 100% | 0% | 0 |
| 946 → MASS RETIREMENTS | 6 | 6 | 6 | 0 | 0 | 0 | 0 | 100% | 0% | 0 |
| 947 → MASS REVALUATION | 10 | 10 | 10 | 0 | 0 | 0 | 0 | 100% | 0% | 0 |
| 948 → MASS TRANSFERS | 1 | 1 | 1 | 0 | 0 | 0 | 0 | 100% | 0% | 0 |
| 949 → REPORTS | 4 | 4 | 4 | 0 | 0 | 0 | 0 | 100% | 0% | 0 |
| 950 → SETUPS | 128 | 128 | 128 | 0 | 0 | 0 | 0 | 100% | 0% | 0 |
| UNASSOCIATED BUGS | N/A | N/A | N/A | N/A | N/A | N/A | N/A | N/A | N/A | 14 |
| ALL | | | | | | | | | | |
| Total | 208 | 208 | 208 | 0 | 0 | 0 | 0 | 100.0% | 0% | 15 |

*FIG. 9B*

| SETUPS | | | | |
|---|---|---|---|---|
| Flow No 960 | Flow Description 962 | Criticality 970 | xbuild 7 977 | xbuild 9 978 |
| 980→ FAST001 | Non MRC | CRITICAL | PASSED | PASSED |
| 981→ FAST014 | Asset Category Flexfield | CRITICAL | PASSED | PASSED |
| 982→ FAST015 | Location Flexfield | CRITICAL | PASSED | PASSED |
| 983→ FAST018 | Fiscal Years | CRITICAL | PASSED | PASSED |
| 984→ FAST019 | Calendars - Monthly | CRITICAL | PASSED | PASSED |
| 985→ FAST023 | Non Group Enabled Corporate Book | CRITICAL | PASSED | PASSED |
| 986→ FAST025 | Non Group Enabled Tax Book | CRITICAL | PASSED | PASSED |
| 987→ FAST104 | Set up Newer User | CRITICAL | PASSED | PASSED |
| 988→ FAST105 | Create Asset Category | CRITICAL | PASSED | PASSED |
| 989→ FAST129 | Bonus Rules - With Factor and Alternate Factor | CRITICAL | PASSED | PASSED |

*FIG. 9C*

FACILITATING ASSESSMENT OF A TEST SUITE OF A SOFTWARE PRODUCT

BACKGROUND

1. Technical Field

The present disclosure relates to software testing, and more specifically to facilitating assessment of a test suite of a software product.

2. Related Art

A software product generally refers to a set of computer programs designed to provide desired features to users. It is often required to test a software product (before making the software product available to users) to ensure that the features are provided as desired in the software product.

Generally, the testing of a software product is performed using a test suite, which may contain a collection of test scripts used to validate the behavior of the various functionalities of the software product.

There is a general need to assess a test suite. For example, a manager of (development/testing of) a software product may wish to know to what extent a test suite tests a software product.

BRIEF SUMMARY

Please refer to the subsection "1. Overview" under the section titled "Description of Example Embodiments"

BRIEF DESCRIPTION OF THE DRAWINGS

Example embodiments of the present invention will be described with reference to the accompanying drawings briefly described below.

FIG. 3 depicts a table in a sample inventory containing the number of execution flows operative when various features are provided by a software product in an embodiment.

FIG. 4A depicts a table in a sample inventory maintaining the details of various execution flows operative when a single feature is provided by a software product in an embodiment.

FIG. 4B depicts a table in a sample inventory maintaining the details of integration points of a software product with other software products in an embodiment FIG. 5 depicts a table in a sample inventory indicating the manner in which test coverage of a test suite of a software product is calculated in an embodiment.

FIG. 6 depicts a table in a sample inventory indicating the manner in which automation coverage of a test suite of a software product is determined in an embodiment.

FIG. 7 depicts a table in a sample inventory indicating the manner in which execution profile of a test suite of a software product is generated in an embodiment.

FIG. 9A depicts an interface providing product level information of a sample testing status report containing the status of testing the execution flows operative when various features are provided by a software product in an embodiment.

FIG. 9B depicts an interface providing feature level information of a sample testing status report containing the status of testing the execution flows operative when various features are provided by a software product in an embodiment.

FIG. 9C depicts an interface providing execution flow level information of a sample testing status report containing the status of testing the execution flows operative when various features are provided by a software product in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

According to an aspect of the present invention, data is maintained specifying the features provided by a software product and execution flows operative when a corresponding feature is provided by the software product. Information indicating execution flows for which test scripts are already present in a test suite of the software product is also provided. Based on such information, a manager may quickly assess various metrics of interest in relation to the test suite.

In an embodiment, weights corresponding to the features of a software product are received and various test metrics are calculated based on the weights and the maintained data. The test metrics calculated include a test coverage indicating the percentage of the software product that has corresponding test scripts (and therefore can be tested manually) and an automation coverage indicating the percentage of the software product that has corresponding automated test scripts.

According to another aspect of the present invention, a priority data indicating a relative importance of each of the corresponding execution flows and a time data containing expected execution times (time required to execute) of the test scripts in the test suite is also maintained. An execution profile indicating a respective aggregate time for features of same relative importance (that is priority) is generated. The execution profile also includes a respective cumulative time indicating the cumulative aggregate expected execution time for each of (and all of) the features above or below each relative importance.

According to yet another aspect of the present invention, the execution flows are associated with a corresponding execution flow type, and test metrics are provided grouped by execution flow types.

According to one more aspect of the present invention, various information thus maintained are made available in the form of a web application. The web application enables a user to interactively enter actual information regarding testing status against each execution flow and view the information based on different levels of information (at the product level, at the feature level or at the execution flow level).

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
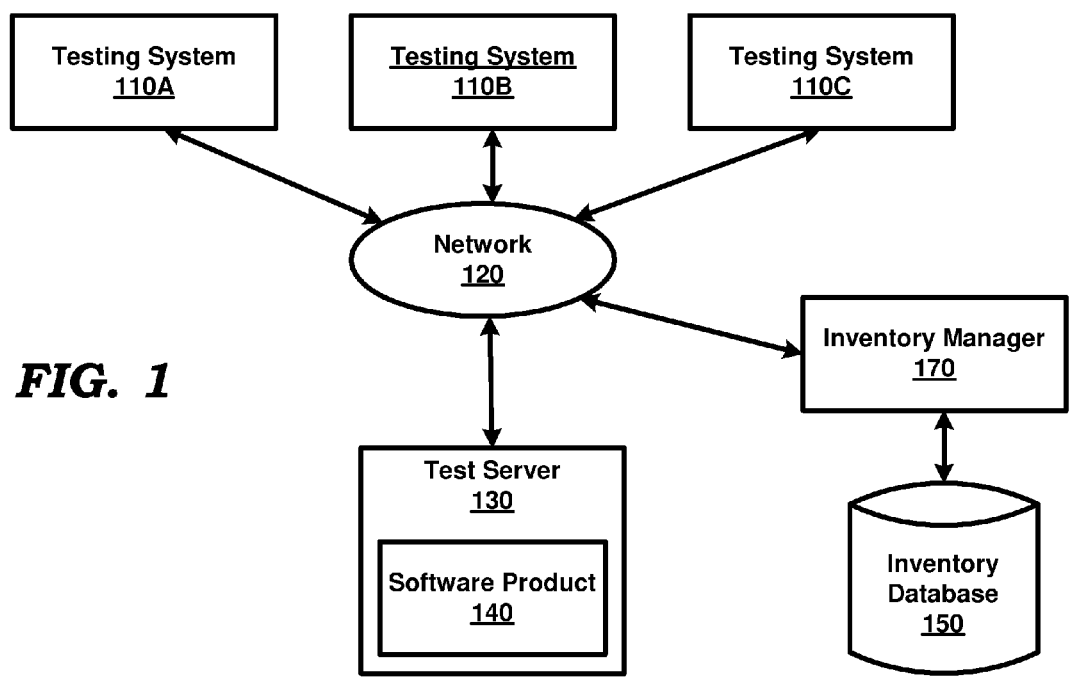
FIG. 1 is a block diagram illustrating an example environment in which several aspects of the present invention can be implemented.

FIG. 1 is a block diagram illustrating an example environment in which several aspects of the present invention can be implemented. The block diagram is shown containing testing systems 110A-110C, network 120, test server 130 containing software product 140, inventory database 150, and inventory manager 170. Merely for illustration, only representative number/type of systems are shown in the Figure. Many environments often contain more/less systems, both in number and type. Each system of FIG. 1 is described below in further detail.

Network 120 provides necessary communication between various testing systems 110A-110C, test server 130 and inventory manager 170. Network 120 may be implemented using protocols such as TCP/IP well known in the relevant arts.

Test server 130 represents a system, such as a server, which contains pre-installed software (such as software product 140) capable of performing operations requested by testing systems 110A-110C. The results of the operations are sent as corresponding responses to the requesting testing systems.

Software product 140 represents a software application that is to be tested by users using one of testing systems 110A-110C. In general, each software product provides several features, some visible to the users and some (internal) which form a basis for providing other features. Examples of software products include business software, word processing software, etc. In case of word processing software, an auto-correct feature may be provided, which corrects incorrect text (based on a dictionary) as a user enters text.

Each of testing systems 110A-110C represents a system such as a personal computer, workstation, mobile station, etc., and is used by a user to test software product 140. The user may download software product 140 (from test server 130) to one of testing systems 110A-110C and test the software product in the environment of the testing system. Alternatively, a user may test software product 140 by generating requests (according to a suitable interface) to test server 130 and examining the corresponding responses.

The users may test software product 140 based on test scripts (belonging to a test suite) available on test systems 110A-110C or on test server 130. The test scripts may be automated scripts or manual scripts. In the case of automated scripts, the testing system or test server may issue commands to the software product based on the content of the script, while in the case of manual scripts, a user may manually perform actions specified by the script and note/examine the corresponding responses. The user may send the results of (automated/manual) testing to inventory manager 170.

Inventory database 150 stores the various test scripts (in the test suite) developed to test the software product of interest. Alternatively, inventory database 150 may merely store data indicating location (e.g., file name, including directory identifier) of the respective test scripts. Inventory database 150 may be implemented using one of several commercial databases available in the market place. However, the inventory can be maintained using simple files, etc., on a secondary storage, as well.

Inventory manager 170 provides various views and metrics, which facilitate assessment of a test suite of a software product. Inventory manager 170 may be provided the status of various test scripts, which forms the basis for such views and metrics. Though shown as a separate unit in the Figure, it should be appreciated that inventory manager 170 can be integrated into various testing tools or information systems, which potentially have complementary or different utility. The manner in which the inventory manager facilitates assessment of a test suite is described in detail below with several examples.

3. Assessment of a Test Suite

Figure 2:
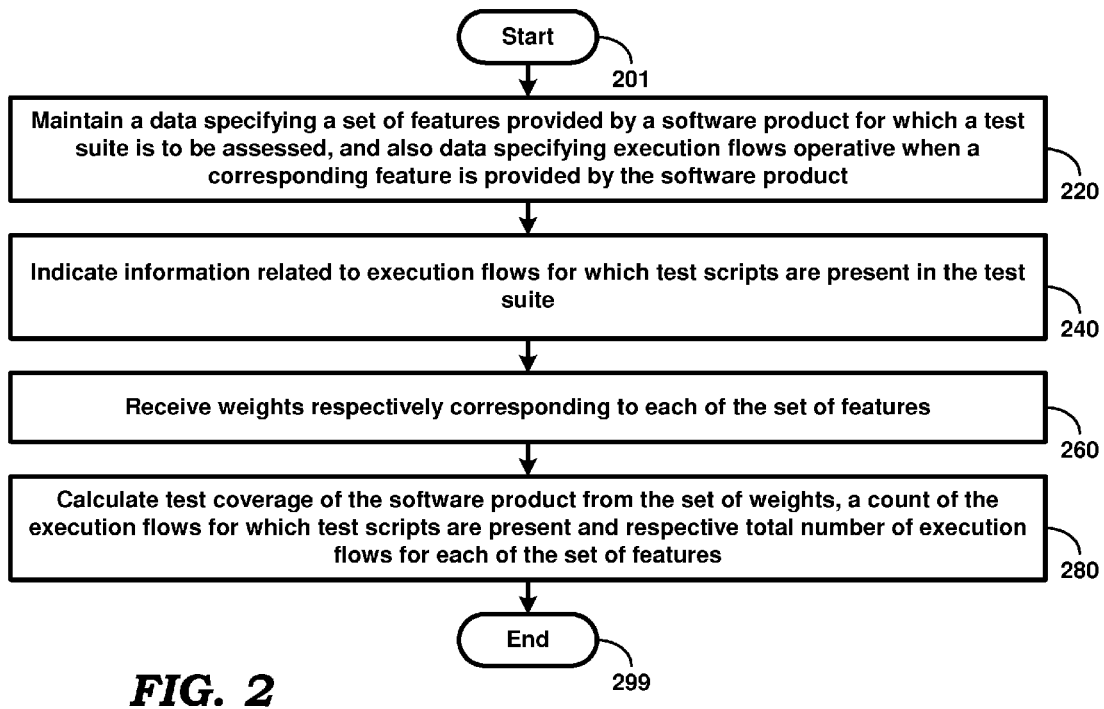
FIG. 2 is a flowchart illustrating the manner in which a test suite of a software product can be assessed according to an aspect of the present invention.

FIG. 2 is a flowchart illustrating the manner in which a test suite of a software product can be assessed according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein. In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 220.

In step 220, inventory manager 170 maintains a data specifying a set of features provided by a software product for which a test suite is to be assessed, and also data specifying execution flows operative when a corresponding feature is provided by the software product. In general, a feature represents a functionality/utility provided by instructions within the software product and each execution flow represents the internal sequences of instructions (logically grouped) that are executed when the feature is provided. Each execution flow may also be chosen to correspond to a sub-feature, which forms the basis for providing a corresponding feature at least in some conditions. As noted above, the features can be visible to users or used internally by other features. The first and second data may be maintained in inventory database 150.

Testing of a feature may be performed by testing execution flows operative when the feature is provided by the software product. For example, an execution flow related to an interface feature (providing an auto-correct functionality) may contain instructions executed when a user enables or disables the auto-correct function in a word processing application. Another execution flow may contain instructions executed to verify whether the auto-correct functionality is performing with a desired behavior and yet another execution flow may specify the manner in which a user may add text to a custom dictionary. Though an execution flow represents sequences of instructions in the following description, in alternative embodiments, an execution flow may represent any portions (of code) of the software product.

In step 240, inventory manager 170 indicates information (in inventory database 150) related to execution flows for which test scripts are present in the test suite. In an embodiment, a test script, which is ready for use/testing, is considered to be present. However, test scripts need not be ready for use/testing, but can be considered present even when at an earlier stage in a development cycle, as suited in the specific environment. It may be appreciated that each execution flow can be tested using one or more scripts, though the example embodiments below contain only a single script for each flow.

Due to the availability of the provided information being organized by features, various types of views and metrics enabling assessment of a test suite may be provided, as described below with more examples.

In step 260, inventory manager 170 receives weights respectively corresponding to each of the set of features. In an embodiment, the weights represent the importance of the corresponding features in the software product. Thus, interface features may have low weights while features implementing business functionality may be associated with high weights. The weights may be received from a user using one of testing systems 110A-110C and validated by a product expert or may be pre-specified by a product expert for a software product. A product expert generally is a user having in-depth understanding of the specific software product including the importance of each feature provided by the software product. As such, the product expert may be able to make informed decisions on the weights that need to be assigned to each of the features.

In step 280, inventory manager 170 calculates test coverage of the software product from the set of weights, a count of the execution flows for which test scripts are present and respective total number of execution flows for each of the set of features. In general, the coverage metric is computed to reflect the weight as well as the fraction of the execution flows for which scripts that are present compared to the total number of execution flows. The flow chart ends in step 299.

It may be appreciated that various other test metrics (other than test coverage) may be determined based on the data in inventory database 150 as described in below sections. To better understand the determination of test metrics, the description is continued illustrating an example inventory.

4. Example Inventory

FIG. 3 depicts a table in a sample inventory (maintained in inventory database 150) containing the number of execution flows operative when various features are provided by a software product in an embodiment. The description is continued assuming that the sample inventory contains the details of the execution flows corresponding to a software product called "Fixed Assets". Though the sample inventory is shown containing a single software product, in alternate embodiments, the inventory database may contain details of multiple software products.

Column 310 "Feature Name" specifies the names of the various features in the product "Fixed Assets". Column 315 "No. of Execution flows" specifies the total number of execution flows for each of the features. Column 320 "FTS Completed" specifies the number of functional test scripts (FTS) present/available for each of the features. Columns 325 "ATS Completed" specifies the number of automated test scripts (ATS) corresponding to FTS that are present/available. Column 330 "Type K (Key Entity/VHP) Flows" specifies the number of execution flows that have been indicated to be of type "key entity" or execution flows that have been associated with a very high priority. Column 330 further contains columns 332 "Total", 334 "in FTS" and 336 "in ATS", which specify the number of Type K flows in total, in the functional test scripts and in automated test scripts respectively.

Each of rows 351-375 specifies the test details for a corresponding feature (identified by the feature name in the corresponding column 310). For example, row 364 specifies a feature with name "Journal Entries", having a total number of 17 execution flows (as shown in column 315), of which 3 execution flows have (present) corresponding test scripts (as shown in column 320) of which only 1 of the test scripts has a corresponding automated script (as shown in column 325). Also, row 364 also specifies that 5 of the 17 execution flows are of Type K (as shown in column 332), 1 execution flow in the 3 test scripts is of Type K (as shown in column 334) and 1 execution flow in the 1 automated script is of Type K (as shown in column 336).

Row 390 indicates the totals of the values corresponding to each column thereby indicating the various values corresponding to the software product. In particular, row 390 indicates that there is 1553 number of execution flows in the software product (as shown in column 315) of which 737 execution flows have corresponding test scripts (as shown in column 320) of which 577 test scripts are automated (as shown in column 325). Row 390 also indicates that there are 106 Type K execution flows (as shown in column 332) of which 83 have corresponding test scripts (as shown in column 334) of which 83 are automated (as shown in column 336).

In the embodiment described below, the various details (such as the number of manual/automated test scripts present for execution flows) of the above table (and other tables in inventory database 150) are maintained/updated manually by users (from one of testing systems 110A-110C) using inventory manager 170. It may be appreciated that in alternate embodiments, the maintenance/update of data in the inventory may be performed in an automated manner by inventory manager 170. For example, a scripting tool may be used by a user to create test scripts in one of testing systems 110A-110C. On completion of creation of the test script, the scripting tool may notify inventory manager 170 about the existence of the test script and the corresponding execution flow enabling the inventory manager 170 to update inventory database 150.

It may be observed that the number of test scripts are less than or equal to the number of execution flows (assuming one test script tests a single feature, even though there may be more than one test script associated with an execution flow). Similarly, the number of automated scripts is also less than or equal to the test scripts. The inventory may also maintain the details of each of the execution flows corresponding to each of the features as described in detail below.

5. Maintaining Execution Flows

FIG. 4A depicts a table in a sample inventory maintaining the details of various execution flows operative when a single feature is provided by a software product in an embodiment. The description is continued assuming that the table depicts the execution flows operative when the feature "Journal Entries" (as shown in row 364) is provided by the software product. It may be observed that the number of rows in the table corresponds to the total number of execution flow for the feature "Journal Entries" in FIG. 3 (value of "17" in column 315 of row 364).

Column 410 "Sr. No" specifies a unique identifier corresponding to each of the execution flows. Column 415 "Execution flow Description" provides a description for each of the execution flows. Column 420 "Priority" specifies a priority for each of the execution flows. The priority (having values such as "Low", "Medium", "High" and "Very High") may indicate the importance of the execution flow in testing the feature. The priority may also be used to group execution flows based on priority (such as Type K execution flows being execution flows with "Very High" priority).

Column 422 "Included in FTS?" indicates whether a test script corresponding to each of the execution flows is present (by value "Yes") or absent (by value "No"). Thus, the total number ("3") of "Yes" values in column 422 indicates the total number of test scripts for the feature "Journal Entries" (as shown in column 320 of row 364). Similarly, column 424 "Included in ATS?" indicates whether an automated script corresponding to the test script (for each of the execution flows) is present (by value "Yes") or absent (by value "No"). Thus, the total number ("1") of "Yes" values in column 424 indicates the total number of automated scripts for the feature "Journal Entries" (as shown in column 325 of row 364).

Column 426 "Actual Execution Time (Hrs)" specifies actual time taken (in hours) to execute the test script for each of the execution flows for facilitating future planning. Column 430 "Source" specifies a document (such as manual, user guide, functional design document, bug number etc.) based on which each of the execution flows is added. Other creation details related to each of the execution flows are specified in column 432 "Date of Addition" specifying the date on which the execution flows is added, column 434 "Release Baseline" indicating the version of the product/feature for which the execution flow is applicable or created, and column 436 "Added By" indicating the user who added the execution flow to the inventory.

The rest of the columns indicate the manner in which each of the execution flows is tested in multiple rounds. In particular, columns 440 "xBuild(s) Tested in System Test 1", 442 "xBuild(s) Tested in System Test 2", 444 "xBuild(s) Tested in System Test 3" indicate the various builds/versions of the product/feature tested on various systems. Column 446 "xBuild(s) Tested Certification" indicates the version that was tested and certified and column 448 "Certification tester" specifies the user executing the flow during certification (final) testing. Such information may be used as inputs for efforts estimation and resource planning during testing.

Each of the rows 451-467 specifies the details according to the above column definitions, for each execution flow. For example, row 463 specifies an execution flow identified by unique identifier "FAJE013" with description "Create accounting" and with a "Very High" priority (as shown in column 420), having a manual test script present ("Yes" in column 422) which is automated ("Yes" in column 424). Other details for execution flow "FAJE013" are specified in the corresponding columns.

Each feature may have a corresponding table containing the details of execution flows operative when the corresponding feature is provided by software product 140. Thus, the different features provided in a software product and the corresponding execution flows related to each of the features are maintained in the inventory.

It may be appreciated that software product 140 may interact/integrate with other software products present in test server 130. An aspect of the present invention maintains information about integration as described in detail below.

FIG. 4B depicts a table in a sample inventory maintaining the details of integration points of a software product with other software products (in an ERP application) in an embodiment. The description is continued assuming that the integration aspect inherent in an ERP application software may be distinctly identified as a feature (called "Integration") of the software product and that the table depicts the execution flows operative when the feature "Integration" (as shown in row 371) is distinctly identified in the software product.

Column 470 "Sr. No" and column 475 "Execution flow Description" are similar to columns 410 and 415 and respectively specify a unique identifier and a description corresponding to each of the execution flows. Similarly, columns 480, 482, 484, 486, 488 and 489 provide information similar to the information provided in respective columns 420, 422, 424, 426, 430 and 432 for each of the execution flows.

Column 477 "Product Feature/Functionality" specifies the feature of the software product in which the execution flow is operative. The execution flow on execution interacts/integrates with other software products (as specified in column 479 "Integration Point [with which other product(s)]?").

Each of the rows 491-497 specifies the execution flows operative when features of the software product interact/integrate with other software products. For example, row 492 specifies an execution flow identified by unique identifier "FAIT002" with description "Create Accounting—Create—with period open—Corporate Book", which is executed when the "Setup" feature is operative (as specified in column 477) and interacts/integrates with the software product named "GL" (as specified in column 479).

Thus, the various features provided in a software product and the corresponding execution flows related to each of the features (as well as the execution flows related to integration of the features with other software products) are maintained in the inventory. The maintained information enables the calculation of the test coverage of a software product as explained with examples below and also act as a ready reference for new software product users to help understand product specific integration points.

6. Calculating Test Coverage

FIG. 5 depicts a table in a sample inventory indicating the manner in which test coverage of a test suite of a software product is calculated in an embodiment. Each of the columns and the rows in the table is described in detail below.

Column 510 "Execution flow Type & Feature Name" specifies the name of each of the features of the product. The type of the execution flow is also indicated as headers such as "Type A—UI & Reports", "Type S—Setups" and "Type B—Business Flows". It may be observed the execution flows may further be typed as "Type K—Key Entity Flows" irrespective of which other type they belong to, which facilitates metrics/information to be provided for key flows. The execution flow types enable a user to group the execution flows in any desired manner.

Column 520 "Feature Weightage % (wrt to the product)" specifies the weight of each of the features of the product as determined by user and validated by product experts. The weight may represent the importance of the feature, as noted above. Column 530 "Total Execution flows" specifies the number of execution flows associated with each of the features.

Column 540 "FTS Coverage" indicates the manner in which the test coverage of the software product is determined. Column 540 further contains column 542 "Completed FTS" indicating the number of execution flows that have (present) corresponding test scripts associated with them, column 544 "Percentage of Completed FTS" indicating the percentage of execution flows that have associated test scripts for each of the features, and column 546 "Percentage of Functionality Covered in Completed FTS" indicating the percentage of execution flows associated with test scripts in relation to the software product. The values in columns 544 and 546 may be calculated using the below formulae:

$$\text{Value in column 544} = (\text{value in column 542}) * 100 / (\text{value in column 530})$$

$$\text{Value in column 546} = (\text{value in column 520}) * (\text{value in column 544}) / 100$$

It may be noted that "*" represents the multiplication operator and "/" represent the division operator. It may be further noted that the results of all the calculations in the present embodiment are rounded off to zero decimals for convenience. Thus, the test coverage can be calculated as:

Value in column 546=(value in column 520)*(value in column 542)/(value in column 530)

Or in general:

$$TC = \sum_{i=1}^{n} W_i \times \frac{T_i}{F_i} \quad \text{Equation 1}$$

Wherein,

TC is the test coverage percentage of the test suite of the software product $\Sigma$ is the summation operator $W_i$ is the weight of the ith feature in the software product $T_i$ is the number of test script present for the ith feature in the software product $F_i$ is the number of execution flows present for the ith feature in the software product Each of rows 561-586 specifies the various features of the software product and the corresponding test coverage of each of the features. For example, row 576 specifies the test coverage for a feature with feature name "Journal Entries" whose weight is assigned as "2%" (as shown in column 520), has 17 execution flows (as shown in column 530) of which 3 execution flows have corresponding test scripts (as shown in column 542). As such for row 576, the values of column 544 and 546 may be calculated using the above formulae as "18%" and "0%" respectively.

It may be observed that the values of columns 530 and 542 correspond to the values in columns 315 and 320 for the feature "Journal Entries" in the table depicted in FIG. 3. Similarly the values in other rows (corresponding to other features) may be retrieved from the table in FIG. 3 and the test coverage of each of the feature may be calculated.

Row 590 specifies the total test coverage for Type K execution flows, with the values in columns 530 and 542 corresponding to the total (row 390) of the values in columns 332 and 334 respectively. The test coverage is calculated as "78%" (as shown in column 546). Further, it may be observed that total test coverage is also calculated and shown based on the type of execution flows. For example, the total test coverage for "Type B—Business Flows" is calculated and shown in the corresponding row as "42%".

Row 595 specifies the total test coverage of the software product with each column value being a total of the values (for the features in other rows) in the same column (excluding row 590). Thus the software product has 1553 execution flows of which 737 have corresponding test scripts (the values in columns 530 and 542 corresponding to the total values in columns 315 and 320 in row 390) present. Thus, the test coverage of the software product may be calculated as "47%" (as shown in column 546).

It may be appreciated that some of the test scripts may be performed in an automated manner using test tools that support automation. It may be desirable to know the automation coverage of software product. The manner in which automation coverage of a software product is determined is described in detail below.

7. Determining Automation Coverage

FIG. 6 depicts a table in a sample inventory indicating the manner in which automation coverage of a test suite of a software product is determined in an embodiment. Each of the columns and the rows in the table is described in detail below.

Columns 610 "Execution flow Type & Feature Name", 620 "Feature Weightage % (wrt to the product)" and 630 "Total Execution flows" are similar to columns 510, 520 and 530 and are not explained for conciseness. Column 640 "Automation Coverage" indicates the manner in which the automation coverage of the software product is determined. Column 640 further contains columns 642, 643, 645, 646, 648 and 649. Each of the columns is described in detail below.

Column 642 "Automation of Completed FTS" indicating the number test scripts that are automated for each of the features. Column 643 "Percentage of Automation Completed" indicating the percentage of test scripts that are automated for each of the features. Column 645 "Additional Automated Execution flows (w/o FTS)" indicates the number of automated scripts (without having corresponding manual test scripts) associated with each feature. Column 646 "Total of Automated Execution flows Available" indicates the total number of automated scripts associated with each of the features. Column 648 "% of Total Automated Execution flows Available" indicates the total number of automated scripts as a percentage of the total number of execution flows for each of the features. Column 649 "Percentage of Functionality Automated" indicates the percentage of automated scripts in relation to the software product.

The different values in columns 643, 646, 648 and 649 may be calculated using the below formulae:

Value in column 643=(value in column 642)*100/ (value in column 630)

Value in column 646=(value in column 642)+(value in column 645)

Value in column 648=(value in column 646)*100/ (value in column 630)

Value in column 649=(value in column 620)*(value in column 648)/100

Thus, the automation coverage can be calculated as:

Value in column 649=(value in column 620)*(value in column 646)/(value in column 630)

Or in general:

$$AC = \sum_{i=1}^{n} W_i \times \frac{A_i}{F_i} \quad \text{Equation 2}$$

Wherein,

AC is the automation coverage of the test suite of the software product $\Sigma$ is the summation operator $W_i$ is the weight of the ith feature in the software product $A_i$ is the number of automated scripts present for the ith feature in the software product $F_i$ is the number of execution flows present for the ith feature in the software product Each of rows 661-686 specifies the various features of the software product and the corresponding automation coverage of each of the features. For example, row 676 specifies the automation coverage for a feature with feature name "Journal Entries" whose weight is assigned as "2%" (as shown in column 620), has 17 execution flows (as shown in column 630) of which 1 execution flow has been automated (as shown in column 642). As such for row 676, the values of column 648 and 649 may be calculated using the above formulae as "6%" and "0%" respectively.

It may be observed that the values of columns 630 and 642 correspond to the values in columns 315 and 325 for the feature "Journal Entries" in the table depicted in FIG. 3. Similarly the values in other rows (corresponding to other features) may be retrieved from the table in FIG. 3 and the test coverage of each of the feature may be calculated.

Row 690 specifies the total test coverage for Type K execution flows, with the values in columns 630 and 642 corresponding to the total (in row 390) of the values in columns 332 and 336 respectively. The automation coverage is calculated as "78%" (as shown in column 649).

Row 695 specifies the total automation coverage of the software product with each column value being a total of the values (for the features in other rows) in the same column (excluding row 690). Thus the software product has 1553 execution flows of which 577 have corresponding automated scripts (the values in columns 630 and 642 corresponding to the total values in columns 315 and 325 in row 390). Thus, the automation coverage of the software product may be calculated as "37%" (as shown in column 649) using the above formulae.

It may be further desirable to estimate the total time required for testing using the test scripts corresponding to all execution flows. Accordingly the description is continued with respect to an execution profile, which indicates the execution time required to test the software product.

8. Generating Execution Profile

FIG. 7 depicts a table in a sample inventory indicating the manner in which execution profile of a test suite of a software product is generated in an embodiment. It may be appreciated that the execution profile is generated assuming that execution flows exist (along with the presently available automated scripts) related to the software product. The various execution times generated (as part of the profile) represent aggregate estimated/approximate times required to perform the manual execution flows and/or manual test scripts and/or automated test scripts and is calculated based on the standard times (required to execute a single script/execution flow) assuming the scripts/execution flows are performed in sequence. Each of the columns and the rows in the table is described in detail below.

Columns 710 "Execution flow Type & Feature Name", 715 "Total Execution flows", 720 "FTS Available", 725 "ATS Available" are similar to columns 510, 530, 542 and 642 and are not explained for conciseness.

Columns 735 "Actual Execution flows Execution Time (Hrs)" specifies the actual time (in hours) taken to execute the test script for all of the execution flows operative when a corresponding feature is provided by the software product. It may be observed that the value in column 735 for a feature (shown in each row) corresponds to the total of the values in column 426 in the table corresponding to the feature.

Column 735 "Standard Manual Execution flows Execution Time (Hrs)" indicates the standard time (in hours) required to test a single execution flow of the feature. The standard time may be pre-specified or may be calculated as the average time required for testing a execution flow over one or more test suites.

Column 740 "Execution Time (Hrs)" indicates the manner in which the execution profile of the software product is generated. Column 740 represents cumulative execution times based on the priorities of the execution flows. Column 740 further contains columns 742, 744, 748 and 750. Each of the columns is explained in detail below.

Column 742 "ATS Execution Time" indicates the execution time required to perform the automated test scripts used for testing each of the features. Column 744 "Manual Execution (All Execution flows)" indicating the execution times when all the test scripts (corresponding to execution flows) are to be executed. Column 744 is further split into multiple columns (744A "VH", 744B "VH+H", 744C "VH+H+M", and 744D "VH+H+M+L") with each column showing the cumulative execution times based on priorities with "VH" indicating very high priority, "H" indicating high priority, "M" indicating medium priority and "L" indicating low priority. Thus, a column labeled "VH+H" indicates the cumulative execution times for all execution flows that have very high priority and high priority. For each priority, the aggregate time may be calculated by multiplying the standard time by the number of execution flows with the corresponding priority.

Similarly column 748 "Manual Execution (Execution flows not Automated)" is further split into columns 748A "VH", 748B "VH+H", 748C "VH+H+M", and 748D "VH+H+M+L", with each column indicating the cumulative execution times of execution flows with corresponding manual test scripts only. Column 750 "Composite Time (Manual+Automated)" indicates the execution time required to perform all the test scripts (both manual and automated).

The different values in columns 774A-774D, 778A-778D and 750 may be calculated using the below formulae (with the calculated value being rounded up to the nearest hour):

Value in column 744$A$-744$D$=(value in column 735)*(number of execution flows with respective priorities)

Value in column 748$A$-74$D$=(value in column 735)*(number of automated execution flows with respective priorities)

Value in column 750=(value in column 748D)+(value in column 742)

Each of rows 761-786 specifies the various features of the software product and the corresponding cumulative execution times for each of the features. For example, row 776 specifies the execution times for a feature with feature name "Journal Entries" which has 17 execution flows (as shown in column 715) of which 3 execution flows have corresponding test scripts (as shown in column 720) of which 1 execution flow has been automated (as shown in column 725). The standard execution time is indicated as 0.50 hours (that is 30 minutes) in column 735.

It may be observed that in FIG. 4, the feature "Journal Entries" has 5 very high priority execution flows (with 1 automated script), 6 high priority execution flows, 5 medium priority execution flows and 1 low priority execution flow. Thus, the various execution times corresponding to row 776 may be generated as below:

Value in column 744$A$=(0.5)*(5)=2.5 (rounded to 3)

Value in column 744$B$=(0.5)*(5+6)=5.5 (rounded to 6)

Value in column 744$C$=(0.5)*(5+6+5)=8 (rounded to 8)

Value in column 744$D$=(0.5)*(5+6+5+1)=8.5 (rounded to 9)

Value in column 748$A$=(0.5)*(5−1)=2 (rounded to 2)

Value in column 748*B*=(0.5)*(5−1+6)=5 (rounded to 5)

Value in column 748*C*=(0.5)*(5−1+6+5)=7.5 (rounded to 8)

Value in column 748*D*=(0.5)*(5−1+6+5+1)=8 (rounded to 8)

The value of column 750 is not shown for row 776 since the automated test scripts (for all the features under Type B) are not currently available for all the features. However, individual calculation of the composite time for each feature may be derived to arrive at time estimate for executing test script for a specific feature only.

Thus, the execution profile (containing the various estimated execution times) of a test suite of a software product is generated. It may be appreciated that the execution profile is generated based on the standard time required to execute a single test script and the automation coverage of the test suite. As such, the execution profile facilitates assessment of various testing scope combinations to arrive at optimal testing scope within available time for a software product.

It may be appreciated that though the execution profile generated assumes the presence of execution flows, the execution profile may alternatively be generated where only the actual scripts (manual/automated) present in the test suite are used to calculate the execution times. In such a scenario, the execution profile would be more closely coupled with the corresponding test suites and therefore may better facilitate assessment of the various test suites of a software product.

It may be further appreciated that the generated execution profile may be used to create a testing project plan (a schedule for executing the various test scripts in the test suite) based on the estimated execution times. Alternatively, the execution profile may be used to verify the feasibility of a proposed test plan. Thus, a user may decide to execute only test scripts corresponding to execution flows having very high priority based on the total time available to the user.

Though the above test metrics of test coverage, automation coverage, and execution profile individually facilitate assessment of a test suite, it may be appreciated that a user may require that the various metrics be provided in a consolidated form. The description is continued illustrating a summary report having the various test metrics in a consolidated form.

9. Summary Report

Figure 8:
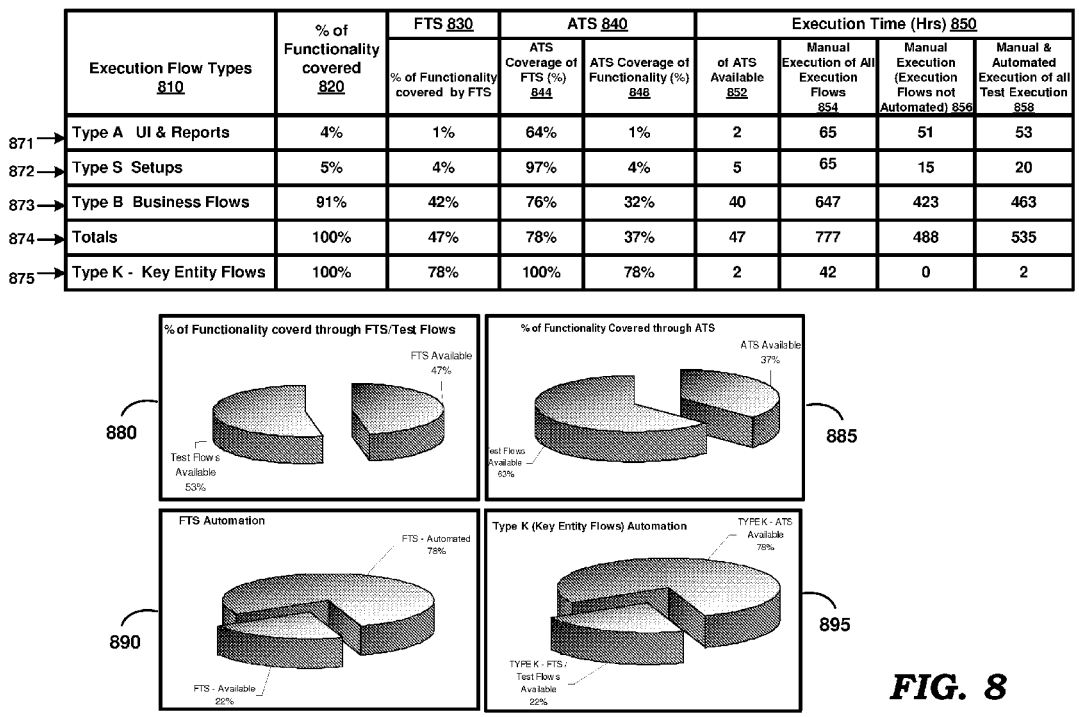
FIG. 8 depicts a summary report containing the various metrics of a test suite of a software product in an embodiment.

FIG. 8 depicts a summary report containing the various metrics of a test suite of a software product in an embodiment. The summary report depicts the various test metrics corresponding to a software product called "Fixed Assets". It may be appreciated that such a summary report may be generated from the inventory maintained in FIGS. 3, 4, 5, 6 and 7 corresponding to the software product "Fixed Assets".

Column 810 "Execution flow Types" depicts the various types of execution flows and correspond to various types depicted (as headers) in column 510. Column 820 "% of Functionality covered" depicts the weights for each of the execution flow types. The values in column 820 correspond to the total weights calculated for each execution flow type in column 520. Column 830 "% of Functionality covered by FTS" represents the test coverage (percentage of execution flows with corresponding test script present in relation to the software product) for each of the execution flow types. The values in column 830 correspond to the total test coverage values calculated for each execution flow type in column 546.

Column 840 "ATS" represents the automation coverage for each of the execution flow types. Column 840 further contains column 844 "ATS Coverage of FTS (%)" indicating the percentage of test scripts that are automated and column 848 "ATS Coverage of Functionality (%)" indicating the percentage of execution flows that have corresponding automated scripts in relation to the software product. The values in columns 844 and 848 correspond to the total values calculated for each execution flow type in columns 643 and 649 respectively.

Column 850 "Execution Time (Hrs)" represents the execution profile for each of the execution flow types. Column 850 further contains column 852 "of ATS Available" indicating the execution times for automated test scripts, column 854 "Manual Execution of All Execution flows" indicating the manual execution times for scripts corresponding to all the execution flows, column 856 "Manual Execution (Execution flows not Automated)" indicating the manual execution times for test script for the execution flows not having automated scripts and column 858 "Manual & Automated Execution of all Execution flows" indicating the total execution time of all the manual scripts and the automated scripts corresponding to all the execution flows. The values in columns 852, 854, 856 and 858 correspond to the total values calculated for each execution flow type in columns 742, 744D, 748D and 750 respectively.

Each of rows 871-873 depicts the various test metrics corresponding to a single execution flow type. For example, row 871 depicts an execution flow type "Type A—UI & Reports" with weight "4%" (as shown in column 820), with test coverage of 1% (as shown in column 830), with automation coverage of 1% (as shown in column 848) and execution time of 51 hours (as shown in column 858). Row 874 depicts the total test metrics for the software product and row 875 depicts the various test metrics for execution flows of Type K.

The various test metric depicted in the table are graphically presented to a user in the form of graphs 880, 885, 890 and 895—each graph representing a pie chart between two test metrics in the table. For example, graph 880 depicts a pie chart for the test metric "FTS Available" with value "47%" (as shown in column 830 of row 874) in comparison to the test metric "Execution flows Available" with value "53%" (calculated as "100%-47%"). It may be appreciated that other types of graphs comparing various other metrics may also be provided to the user.

Thus, the summary report provides various test metrics of a test suite of a software product to a user in a consolidated/convenient format. Using the information maintained/generated (as described in detail above) the user may formulate a test plan specifying the manner in which the software product is to be tested. The test plan may then be performed, and the actual results of testing the execution flows (using the corresponding test scripts) may be obtained.

An aspect of the present invention provides the information maintained in the inventory in the form of a web application. The web application enables a user to interactively enter the actual testing status against each execution flow to facilitate generation of a testing status report as described in detail below.

10. Web Application

FIGS. 9A, 9B and 9C depict various interfaces provided by a web application to enable a user to view the details of a sample testing status report containing the status of testing the execution flows operative when various features are provided by a software product in an embodiment. Each of the figures is described in detail below.

Broadly the various interfaces provided by the web application enables a user to view details of an inventory at different levels of information such as product level, feature level and execution flow level. Though the description is continued assuming that the web application is provided as a part of inventory manager 170, it may be appreciated that the web application may exist as an independent web application (executing on an appropriate server such as test server 130). Similarly, though only interfaces corresponding to three levels of information are described below, in alternate embodiments, more/less levels may be provided with corresponding same/different interfaces displaying varied amount/format of details of the inventory.

Inventory manager 170 receives requests from a user (using one of testing systems 110A-110C) for details of the sample inventory at a desired level of information. The interface corresponding to the requested level of information is generated and sent as the response to the requesting user. The description is continued illustrating an interface providing product level information of a sample inventory in an embodiment.

FIG. 9A depicts an interface providing product level information of a sample testing status report containing the status of testing the execution flows operative when various features are provided by a software product in an embodiment. The interface displays the details of each software product in the inventory.

Column 905 "Product" depicts the name of the software product. Column 910 "All Flows" indicates the total number of execution flows for each of the software products. Column 912 "Number of Flows" depicts various metrics about the execution flows related to a software product. Column 912 further contains multiple columns such as column "Pass" indicating the number of execution flows that tested successfully, column "Fail" indicating the number of execution flows that failed during testing (with sub columns providing detailed information about when the failure occurred), and column "Unable to Test" indicating the number of execution flows that could not be tested.

Column 915 "Percentage Completion" indicates the percentage of execution flows that were tested using corresponding test scripts. Column 915 further contains multiple columns such as column "Pass" indicating the percentage of execution flows that tested successfully, and column "Fail" indicating the percentage of execution flows that failed during testing. Similarly, column 918 "Certification Test Completion" indicates the percentage of execution flows that were tested and certified (with sub columns indicating the "Pass" and "Fail" percentages). Column 920 "Open Functional Bugs" indicates the various software bugs that were discovered during testing.

Each of the rows in the interface depicts the details of a software product in the inventory. For example, row 925 specifies a product "fa" ("Fixed Assets") having 208 execution flows (as shown in column 910) of which 208 flows were tested successfully (as shown in "Pass" sub column under column 912) resulting in 100% completion (as shown in "Pass" sub column under column 915).

It may be observed that the each of the software products in the inventory is provided as a hyper link (shown as underlined) enabling a user to select a desired software product and to view the feature level information of the software product as described in detail below.

FIG. 9B depicts an interface providing feature level information of a sample testing status report containing the status of testing the execution flows operative when various features are provided by a software product in an embodiment. The interface displays the details in the inventory of each feature provided by a software product "fa". The interface may be displayed in response to a user selecting the software product "fa" (by clicking on the corresponding hyper link) in the interface depicted in FIG. 9A.

Column 930 "Feature" depicts the name of the feature. Column 934 "Number of Flows" indicated the number of flows corresponding to each feature. Column 934 further contains sub columns such as column "All" indicating the total number of execution flows, column "Planned to Test" indicating the executions that are planned to be tested, column "Pass" indicating the number of execution flows that were tested successfully and column "Fail" indicating the number of execution flows that failed during testing. Column 934 further contains sub columns such as column "Unable to Test" indicating the number of executions flows that could not be tested, column "WIP" indicating the number of execution flows that are currently being tested, and column "Not Started" indicating the number of execution flows that have yet to be tested.

Similarly, column 936 "Percentage Completion" indicates the percentage of execution flows corresponding to each feature with sub columns such as "Pass" and "Fail" respectively indicating the percentage of execution flows that were tested successfully and the percentage of execution flows that failed during testing. Column 938 "Open Functional Bugs" indicates the number of bugs discovered during testing of the execution flows corresponding to each of the features. Though not shown, column 938 may further contain sub columns indicating the number of bugs based on the priority associated with the bugs discovered during testing.

Each of rows 940-950 depicts the details of testing of a feature provided by the software product "fa". In particular, row 950 depicts a feature with name "Setups" having 128 execution flows (as shown in the "Planned—All" sub column under column 934) of which 128 execution flows were tested successfully (as shown in the "Planned—Pass" sub column under column 934) resulting in 100% pass percentage (as shown in the "Pass" sub column under column 936).

It may be observed that the execution flows corresponding to each of the features is provide as a hyper link (shown as underlined) enabling a user to select a desired feature and to view the execution flow level information for the feature of the software product as described in detail below.

FIG. 9C depicts an interface providing execution flow level information of a sample testing status report containing the status of testing the execution flows operative when various features are provided by a software product in an embodiment. The interface displays the details in the inventory of each execution flow operative when a corresponding feature "Setups" is provided by a software product "fa". The interface may be displayed in response to a user selecting the feature "Setups" (by clicking on the corresponding hyper link) in the interface depicted in FIG. 9B.

Column 960 "Flow No" specifies a unique identifier corresponding to each of the execution flows. Column 965 "Flow Description" provides a description for each of the execution flows. Column 970 "Criticality" specifies a relative critical importance for each of the execution flows. Columns 977 "xBuild 7" and 978 "xBuild 9" indicate the status of testing of the test script corresponding to each of the execution flows during two different stages.

Each of rows 980-989 specifies the details of testing of an execution flow operative when the feature "Setups" is provided by the software product "fa". It may be observed that only a few sample rows are shown in the Figure to avoid obscuring the features of the invention (as the "Setups" feature is associated with 128 execution flows as shown in FIG. 9B). In particular, row 980 depicts an execution flow with unique identifier "FAST001" (as shown in column 960) named "Non MRC" (as shown in column 965) and having a "Critical" importance (as shown in column 970). Row 980 also indicates that the execution flow "FAST001" has been successfully tested in both stages of testing (as indicated by the value "Passed" in respective columns 977 and 978).

Thus, a user may initialize a first request for product level information and then selects one of the products (such as "fa"), which generates a second request for feature level information for the selected product. In the interface showing feature level information, a user may further select one of the features (such as "Setups"), generating a third request for execution flow level information. Thus, a user may drill down from a high level interface providing general information (such as product level) to lower level interfaces providing specific information (such as execution flow level).

It should be appreciated that the features described above can be implemented in various embodiments as a desired combination of one or more of hardware, software and firmware. The description is continued with respect to an embodiment in which various features are operative when software instructions are executed.

11. Digital Processing System

Figure 10:
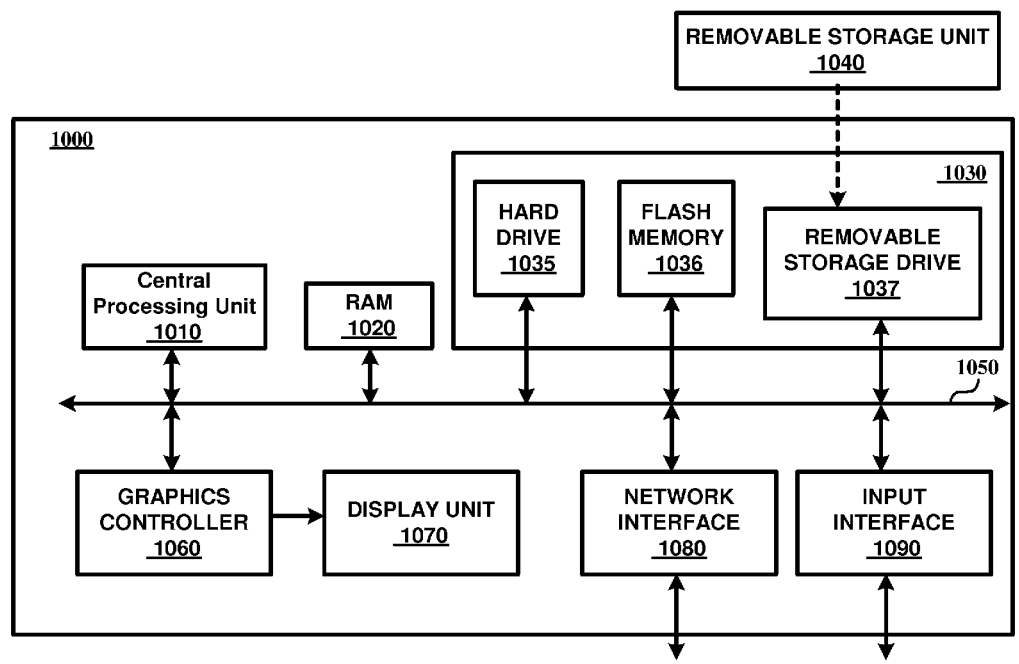
FIG. 10 is a block diagram illustrating the details of a digital processing system in which various aspects of the present invention are operative by execution of appropriate software instructions.

FIG. 10 is a block diagram illustrating the details of digital processing system 1000 in which various aspects of the present invention are operative by execution of appropriate software instructions. Digital processing system 1000 may correspond to inventory manager 170. Digital processing system 1000 may contain one or more processors (such as a central processing unit (CPU) 1010), random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present invention. CPU 1010 may contain multiple processing units, with each processing unit potentially being designed for a specific task. Alternatively, CPU 1010 may contain only a single general purpose processing unit. RAM 1020 may receive instructions from secondary memory 1030 using communication path 1050.

Graphics controller 1060 generates display signals (e.g., in RGB format) to display unit 1070 based on data/instructions received from CPU 1010. Display unit 1070 contains a display screen to display the images defined by the display signals. Input interface 1090 may correspond to a keyboard and a pointing device (e.g., touch-pad, mouse). Network interface 1080 provides connectivity to a network (e.g., using Internet Protocol), and may be used to communicate with others connected systems (such as testing systems 110A-110C and test server 130) of FIG. 1.

Secondary memory 1030 may contain hard drive 1035, flash memory 1036, and removable storage drive 1037. Secondary memory 1030 may store the data (e.g., portions of tables depicted in FIGS. 3, 4A, 4B, 5, 6 and 7) and software instructions, which enable system 1000 to provide several features in accordance with the present invention. Some or all of the data and instructions may be provided on removable storage unit 1040, and the data and instructions may be read and provided by removable storage drive 1037 to CPU 1010. Floppy drive, magnetic tape drive, CD-ROM drive, DVD Drive, Flash memory, removable memory chip (PCMCIA Card, EPROM) are examples of such removable storage drive 1037.

Removable storage unit 1040 may be implemented using medium and storage format compatible with removable storage drive 1037 such that removable storage drive 1037 can read the data and instructions. Thus, removable storage unit 1040 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 1040 or hard disk installed in hard drive 1035. These computer program products are means for providing software to system 1000. CPU 1010 may retrieve the software instructions, and execute the instructions to provide various features of the present invention described above.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A method of facilitating assessment of test suites used for testing of a software product, said method comprising:

maintaining a first data specifying a plurality of features provided by said software product, and a second data specifying a respective set of execution flows operative when corresponding feature is provided by said software product, wherein each of said plurality of features represents a corresponding functionality provided by said software product, wherein said second data specifies that a first set of execution flows is operative when a first feature of said plurality of features is provided by said software product;

receiving a test suite containing a plurality of test scripts, said test suite designed for testing of said software product, for each of said execution flows specified by said second data, further receiving information indicating whether a test script for testing the execution flow is present in said plurality of test scripts; and determining, for each of the said plurality of features specified in said first data, a corresponding test coverage of said test suite, wherein said determining of the test coverage for each feature is based on the respective set of execution flows specified for the feature by said second data, and whether for each execution flow of the respective set, said information indicates the presence or absence of a test script for the execution flow, wherein said test coverage for said software product is determined based on said first data, said second data and said information, without executing said plurality of test scripts, wherein said test coverage indicates the extent to which said plurality of features would be tested upon later execution of said plurality of test scripts.

2. The method of claim 1, wherein said determining determines a count of a number of execution flows for which test scripts are present in said test suite for each feature based on said information.

3. The method of claim 2, said determining further comprising:
receiving a plurality of weights respectively corresponding to said plurality of features; and
calculating said test coverage of said software product from said plurality of weights, said counts and respective total number of execution flows for said plurality of features.

4. The method of claim 3, wherein said test coverage (TC) is calculated as:

$$TC = \sum_{i=1}^{n} W_i \times \frac{T_i}{F_i}$$

wherein,
$\Sigma$, =, and x respectively represent a summation operator, equality symbol, and multiplication operator,
Wi is the weight of the ith feature in the software product,
Ti is the number of test script present for the ith feature in the software product, and
Fi is the number of execution flows present for the ith feature in the software product.

5. The method of claim 3, wherein said determining further determines a second count indicating a number of execution flows for which test scripts are automated, said method further comprising:
determining an automation coverage of said software product from said plurality of weights, said second counts and said total number of execution flows.

6. The method of claim 5, wherein said determining computes automation coverage (AC) of said test suite according to:

$$AC = \sum_{i=1}^{n} W_i \times \frac{A_i}{F_i}$$

wherein,
$\Sigma$ is the summation operator,
Wi is the weight of the ith feature in the software product,
Ai is the number of automated scripts present for the ith feature in the software product, and
Fi is the number of execution flows present for the ith feature in the software product.

7. The method of claim 1, wherein said maintaining maintains a priority data indicating a relative importance of each of the corresponding execution flows.

8. The method of claim 7, wherein said maintaining maintains a time data containing a plurality of expected execution times of said test scripts, wherein each of said plurality of execution times is a time required to execute corresponding test script, said method further comprising:
generating an execution profile indicating a respective aggregate time for execution flows of same relative importance.

9. The method of claim 8, wherein said execution profile further comprises a respective cumulative time indicating the cumulative aggregate expected execution time for all execution flows above or below each relative importance.

10. The method of claim 1, wherein said maintaining maintains an execution flow type data indicating a type of each of the corresponding execution flows.

11. The method of claim 10, further comprising providing a summary report containing a test coverage indicating a percentage of execution flows for which test scripts are present for execution flows of each type, an automation coverage indicating a percentage of test scripts which are automated for execution flows of each type, and an execution profile indicating an aggregate time required to execute test scripts for execution flows of each type.

12. A digital processing system comprising:
a memory to store a set of instructions;
a processor to retrieve and execute said instructions, wherein execution of said set of instructions causes said digital processing system to perform the actions of:
maintaining a first data specifying a plurality of features provided by said software product, and a second data specifying a respective set of execution flows operative when corresponding feature is provided by said software product, wherein each of said plurality of features represents a corresponding functionality provided by said software product, wherein said second data specifies that a first set of execution flows is operative when a first feature of said plurality of features is provided by said software product;
receiving a test suite containing a plurality of test scripts, said test suite designed for testing of said software product,
for each of said execution flows specified by said second data, further receiving information indicating whether a test script for testing the execution flow is present in said plurality of test scripts; and
determining, for each of the said plurality of features specified in said first data, a corresponding test coverage of said test suite,
wherein said determining of the coverage for each feature is based on the respective set of execution flows specified for the feature by said second data, and whether for each execution flow of the respective set, said information indicates the presence or absence of a test script for the execution flow,
wherein said test coverage for said software product is determined based on said first data, said second data and said information, without executing said plurality of test scripts,
wherein said test coverage indicates the extent to which said plurality of features would be tested upon later execution of said plurality of test scripts.

13. The digital processing system of claim 12, wherein said determining determines a count of a number of execution flows for which test scripts are present for each feature, said digital processing system further performing the actions of:
receiving a plurality of weights respectively corresponding to said plurality of features; and
calculating said test coverage of said software product from said plurality of weights, said counts and respective total number of execution flows for said plurality of features.

14. The digital processing system of claim 13, wherein said determining further determines a second count indicating a number of execution flows for which test scripts are automated, said digital processing system further performing the actions of:
determining an automation coverage of said software product from said plurality of weights, said second counts and said total number of execution flows.

15. A non-transitory machine readable medium storing carrying one or more sequences of instructions for causing a system to facilitate assessment of test suites used for testing of a software product, wherein execution of said one or more sequences of instructions by one or more processors contained in said system causes said system to perform the actions of:

maintaining a first data specifying a plurality of features provided by said software product, and a second data specifying a respective set of execution flows operative when corresponding feature is provided by said software product, wherein each of said plurality of features represents a corresponding functionality provided by said software product, wherein said second data specifies that a first set of execution flows is operative when a first feature of said plurality of features is provided by said software product;

receiving a test suite containing a plurality of test scripts, said test suite designed for testing of said software product, for each of said execution flows specified by said second data, further receiving information indicating whether a test script for testing the execution flow is present in said plurality of test scripts; and determining, for each of the said plurality of features specified in said first data, a corresponding test coverage of said test suite, wherein said determining of the test coverage for each feature is based on the respective set of execution flows specified for the feature by said second data, and whether for each execution flow of the respective set, said information indicates the presence or absence of a test script for the execution flow, wherein said test coverage for said software product is determined based on said first data, said second data and said information, without executing said plurality of test scripts, wherein said test coverage indicates the extent to which said plurality of features would be tested upon later execution of said plurality of test scripts.

16. The non-transitory machine readable medium of claim 15, wherein said determining determines a count of a number of execution flows for which test scripts are present in said test suite for each feature based on said information.

17. The non-transitory machine readable medium of claim 16, said determining further comprising:

receiving a plurality of weights respectively corresponding to said plurality of features; and calculating said test coverage of said software product from said plurality of weights, said counts and respective total number of execution flows for said plurality of features.

18. The non-transitory machine readable medium of claim 17, wherein said test coverage (TC) is calculated as:

$$TC = \sum_{i=1}^{n} W_i \times \frac{T_i}{F_i}$$

wherein, $\Sigma$ is the summation operator, $\Sigma$, =, and x respectively represent a summation operator, equality symbol, and multiplication operator, Wi is the weight of the ith feature in the software product, Ti is the number of test script present for the ith feature in the software product, and Fi is the number of execution flows present for the ith feature in the software product.

19. The non-transitory machine readable medium of claim 17, wherein said determining further determines a second count indicating a number of execution flows for which test scripts are automated, further comprising:

determining an automation coverage of said software product from said plurality of weights, said second counts and said total number of execution flows.

20. The non-transitory machine readable medium of claim 19, wherein said determining computes automation coverage (AC) of said test suite according to:

$$AC = \sum_{i=1}^{n} W_i \times \frac{A_i}{F_i}$$

wherein, $\Sigma$ is the summation operator,

Wi is the weight of the ith feature in the software product,

Ai is the number of automated scripts present for the ith feature in the software product, and Fi is the number of execution flows present for the ith feature in the software product.

21. The non-transitory machine readable medium of claim 15, wherein said maintaining maintains a priority data indicating a relative importance of each of the corresponding execution flows.

22. The non-transitory machine readable medium of claim 21, wherein said maintaining maintains a time data containing a plurality of expected execution times of said test scripts, wherein each of said plurality of execution times is a time required to execute corresponding test script, further comprising:

generating an execution profile indicating a respective aggregate time for execution flows of same relative importance.

23. The non-transitory machine readable medium of claim 22, wherein said execution profile further comprises a respective cumulative time indicating the cumulative aggregate expected execution time for all execution flows above or below each relative importance.

24. The non-transitory machine readable medium of claim 15, wherein said maintaining maintains an execution flow type data indicating a type of each of the corresponding execution flows.

25. The non-transitory machine readable medium of claim 24, further comprising providing a summary report containing a test coverage indicating a percentage of execution flows for which test scripts are present for execution flows of each type, an automation coverage indicating a percentage of test scripts which are automated for execution flows of each type, and an execution profile indicating an aggregate time required to execute test scripts for execution flows of each type.

* * * * *

UNITED STATES PATENT AND TRADEMARK OFFICE
CERTIFICATE OF CORRECTION

PATENT NO.        : 8,024,709 B2
APPLICATION NO.   : 11/744920
DATED             : September 20, 2011
INVENTOR(S)       : Jadhav et al.

Page 1 of 1

It is certified that error appears in the above-identified patent and that said Letters Patent is hereby corrected as shown below:

On front page, in column 2, under "Other Publications", line 3, delete "&isnumber" and insert -- &arnumber --, therefor.

On Sheet 5 of 13, in figure 4B, Reference Numeral 494, line 1, delete "Requestfor" and insert -- Request for --, therefor.

On Sheet 5 of 13, in figure 4B, Reference Numeral 495, line 1, delete "Requestfor" and insert -- Request for --, therefor.

On Sheet 7 of 13, in figure 6, Reference Numeral 645, line 2, delete "Automoted" and insert -- Automated --, therefor.

On Sheet 9 of 13, in figure 8, Box 880, line 1, delete "coverd" and insert -- covered --, therefor.

In column 1, line 50, delete "embodiment" and insert -- embodiment. --, therefor.

Signed and Sealed this
Sixth Day of December, 2011

David J. Kappos
*Director of the United States Patent and Trademark Office*